United States Patent [19]

Bergstrom et al.

[11] Patent Number: 4,710,691

[45] Date of Patent: Dec. 1, 1987

[54] PROCESS AND APPARATUS FOR CHARACTERIZING AND CONTROLLING A SYNCHRONOUS MOTOR IN MICROSTEPPER MODE

[75] Inventors: Donald J. Bergstrom, San Diego; Allan J. Wolfer, Encinitas, both of Calif.

[73] Assignee: Anacomp, Inc., Carmel, Ind.

[21] Appl. No.: 845,923

[22] Filed: Mar. 27, 1986

[51] Int. Cl.⁴ .............................................. H02P 8/00
[52] U.S. Cl. .................................. 318/696; 318/685; 318/632
[58] Field of Search ........................ 318/696, 685, 632

[56] References Cited

U.S. PATENT DOCUMENTS

| | | | |
|---|---|---|---|
| 3,555,254 | 1/1971 | Gerber | 318/632 |
| 3,588,662 | 6/1971 | Buebel, Jr. et al. | 318/696 |
| 3,593,097 | 7/1971 | Gebelein, Jr. | 318/696 |
| 3,719,878 | 3/1973 | Ferguson et al. | 318/565 |
| 3,748,566 | 7/1973 | Brembs | 318/685 |
| 3,753,106 | 8/1973 | Brosens | 324/125 |
| 3,893,011 | 7/1975 | Inanba et al. | 318/685 |
| 3,908,195 | 9/1975 | Leenhouts | 444/1 |
| 3,932,796 | 1/1976 | Kreithen et al. | 318/685 |
| 3,990,014 | 11/1976 | Hakozaki | 328/42 |
| 4,072,888 | 2/1978 | Bechtle et al. | 318/685 |
| 4,081,736 | 3/1978 | Leenhouts et al. | 318/696 |
| 4,107,595 | 8/1978 | Campe | 318/696 |
| 4,149,199 | 4/1979 | Chick et al. | 360/77 |
| 4,156,170 | 5/1979 | Strunc | 318/696 |
| 4,272,712 | 6/1981 | Beling et al. | 318/696 |
| 4,283,672 | 8/1981 | Throssell | 318/696 |
| 4,284,940 | 8/1981 | Welburn | 318/696 |
| 4,289,983 | 9/1981 | Bengnar et al. | 310/49 R |
| 4,297,625 | 10/1981 | Newell | 318/696 |
| 4,306,181 | 12/1981 | Welburn | 318/696 |
| 4,337,994 | 7/1982 | Brasier | 350/3.71 |
| 4,409,526 | 10/1983 | Yamauchi et al. | 318/254 |
| 4,426,608 | 1/1984 | Larson et al. | 318/685 |
| 4,446,412 | 5/1984 | Friedman et al. | 318/696 |
| 4,477,757 | 10/1984 | Palombo et al. | 318/696 |

OTHER PUBLICATIONS

Proceedings, Sixth Annual Symposium on Incremented Motion Control Systems and Devices, B. C. Kuo, Editor, May 1977, "Digital Sine-Cosine Ministepping Motor Drive, Howard P. Lager, pp. 179-183.

Slingland, Small Steps Turn Into Big Improvements, Powerconversion International, pp. 20-25 (1983).

Advertisement of Compumotor Corporation, M57 Series Motor/Driver.

Primary Examiner—William M. Shoop, Jr.
Assistant Examiner—Saul M. Bergmann
Attorney, Agent, or Firm—Baker, Maxham & Jester

[57] ABSTRACT

A process for characterizing the motion of a synchronous motor in microstep mode to achieve desired precise velocity motion at the final output. The motor velocity is directly proportional to the frequency of the microstep excitation pulses which control the rate of change of sine/cosine motor currents. The motor is initially operated at normalized frequency by means of a digital memory which controls a microstep clock pulse rate. Velocity and position errors at discrete locations are then determined and frequency correction terms are inserted into the memory at a predetermined time before the correction is to take effect on the motor. Also disclosed is apparatus for controlling the operation of the motor with the thus created characterization enhanced memory. The operating apparatus includes means to devise sine and cosine signals which always remain in synchronism and through which the signals from the memory are applied to the quadrature windings of the motor. The rate at which the sine-cosine waves are incremented is determined by the preprogrammed digital memory so that the resultant rotational velocity is controlled. Additionally, when the motor operates in an optical system, the preprogrammed memory corrects not only for motor motion errors but also for non-linearities or image plane distortions resulting from optical distortions in the lens system by modifying the scan speed in the manner previously mentioned. Additional aspects of the invention includes a feedback arrangement comprising the motor windings to correct for resistance variations and temperature changes, and a capacitor across each of the windings to reduce the effects mechanical resonance.

28 Claims, 10 Drawing Figures

FIRST AND THIRD QUADRANTS

FIG. 7B

SECOND AND FOURTH QUADRANTS

FIG. 8

PROCESS AND APPARATUS FOR CHARACTERIZING AND CONTROLLING A SYNCHRONOUS MOTOR IN MICROSTEPPER MODE

FIELD OF THE INVENTION

This invention relates generally to synchronous motors operating in the microstep mode, and more paticularly to a process and apparatus for characterizing the motion of the motor and then controlling the motor with corrected inputs based on the data determined from the characterization process.

BACKGROUND OF THE INVENTION

There are many motion control systems where repetitive motion through a limited length or arc are required. Scanners are examples of such repetitive motion and many different types have varying accuracy requirements. Where high accuracy is necessary, velocity of the scanning beam should be as precise as possible.

Many techniques have been used in attempts to linearize scan velocity. Galvanometer driven mirrors have used high frequency capacitance position feedback transducers. Additionally, these galvanometer scanners may use optical zero position feedback, derived velocity feedback and constant temperature controls to achieve the desired accuracy. The corrections for galvanometer scan distortions result in an expensive system which is difficult to manufacture to the necessary tolerances.

Servomotor powered mirrors have employed geared-down position encoders for feedback. However, the gear train introduces an unwanted inertial load which slows down the retrace time in repetitive motion devices. Gear train nonuniformity causes scan velocity errors.

The above drawbacks have led to efforts to use stepper motors to obtain scan linearity or control.

Stepper motors can be employed in many instances to move a load to a dimensionally digitized position, replacing machine tool servomotors functioning by feedback errors. Microstepping motor systems offer repeatable, high resolution motion control in a field previously dominated by DC servos. These devices are controlled by discrete electronic devices, making them inherently compatible with digital motion control techniques used in scientific investigation, automation and robotics, among other areas of industry. A significant advantage of employing microstepper motors for precision motor control is that they do not require complex control feedback loops. They have thus been proven useful for scanning systems.

Stepper motors differ from many other types of motors in that they rotate in discrete increments and do not have brushes. Thus, the only wearing parts are the bearings at either end of the rotor. Because the motor moves in discrete increments, its position is easily monitored without the need for complicated feedback mechanisms. The stepping motion is controlled by pulses where one pulse results in one motor step. In some systems it is only necessary to monitor the number of input pulses in order to know the position of the motor. To a certain extent, this feature also allows velocity control. A constant, stable, jerky velocity is obtained by providing a constant, stable stream of pulses to the motor system, all at very low cost. However, it is necessary to know the starting position with precision in order to determine the instantaneous position after the motor has been excited by a particular number of pulses.

There are several factors that impair stepper motor performance and these include winding impedance variations, bearing irregularities, magnetic vagaries, thermal effects, resonance and other step-to-step sources of error in positioning and torque. Some fine angle stepping motors have very good position resolution but show a velocity error due to inherent to tolerance related irregularities in the physical structures of the rotor and stator teeth which cause velocity errors during the movement from one step to the next.

Typically a two phase, permanent magnet, hybrid stepper motor has a basic characteristic of 200 steps-per-revolution. The number of steps is based on the number of teeth on the rotor and the number of teeth on the stator which are comprised of poles with electrical windings thereon. High rotational resolutions, such as 20,000 to 50,000 steps per revolution, are commonly available. These increased resolutions are achieved electronically, not be increasing the number of teeth on the rotor and stator. Interphase current variations create a series of pseudo pole pairs. An equal interphase current causes half-step positioning, while an unequal current causes positioning approximately proportional to the current ratio.

The key to precision microstepping resides in techniques to digitize a sine wave such that its sine and cosine components will drive a two phase stepper motor in equal increments while maintaining constant torque.

By ratioing the current in the phase windings, the rotor may be positioned at any point between two full steps. One method for accomplishing this result is continuous current controlled through an analog circuit. This may be a linear analog current metering method based on lookup values stored for reference in either a ROM or a PROM. Attempts have been made to tailor a lookup table to a motor design and take into account variations caused by step rate, step size and load change. Current ratio values that produce each microstep may be tailored to a given motor model and stored in a PROM. This is done by varying the sine/cosine current relationships. This method has proven to be effective under certain circumstances but has limitations because each motor of a particular model has its own unique charateristics. However, the factors stated above that impair stepper motor performance still apply in many instances despite precise current ratio control. It has been found that even with excellent ratio control, there may still be pole-to-pole or step-to-step errors in motor velocity.

The generally employed technique for accurately controlling a microstepper is to assign a final position and create techniques to achieve the desired position accuracy at the predetermined final position. With such a control system, the inherent ±3% error of the stepper applies to the final position and there is normally some oscillation when the motor comes to a stop. These control systems have little concern with the velocity at any moment between start and stop.

When a stepper motor is converted to operate in the microstepper mode with 20,000 to 50,000 steps per revolution, many of the distinctions between incremental and continuous rotary motion control appear to be clouded. However, the preciseness of control of a microstepper still exists even though a motor moves with many microsteps per degree of revolution.

Basic advantages of microstepping motors result from the characteristics of noncumulative errors, repeatability, open loop positioning and simple pulse control. It has been suggested that where very high accuracy position requirements exist, a feedback circuit may be necessary. In such instances a position encoder could be used. Where extreme accuracy is required, such as in scanning a microimage or creating the designs in integrated circuits which may have a width of approximately one micron or less, it is often necessary to have a degree of velocity control not previously available. In these applications it is not necessarily the end position that is of primary importance but that velocity at all intermediate points be constant or precisely controlled.

SUMMARY OF THE INVENTION

Broadly speaking, this invention relates to a method and apparatus for controlling a synchronous motor in the microstep mode with extreme velocity control from the beginning to the end of each repetitive motion. This is accomplished in a motor driver configured for more than 200,000 steps per revolution. A significant factor in this operational control is a method for characterizing a particular motor and storing the characterization data in a memory which is then used to repeatably control the actual rotational movement of the stepper motor to achieve precise final motion control. The invention applies generally to synchronous motors. Because stepper motors are an example of a synchronous motor, the terms "stepper" is used herein and "microstepper" and "microstepping" are employed to include the term "microstep".

In the characterizing process, the memory is normalized at a predetermined frequency. By appropriate means such as a micrometer or traveling microscope, positional errors at predetermined microstep positions of the motor are dynamically determined. Correction terms are then entered in memory, preferably a predetermined number of microsteps before the observed position error being corrected for, and the motor is then run to verify the results of the entered correction. This process is repeated for an appropriate number of microstep positions to the end of the desired motor rotation. This process can be employed for the entire 360° of rotation or it can be used for any desired portion of the possible motor rotation.

The system of the invention recognizes and employs several characteristics in order to achieve the desired velocity linearity. Stepper motor motion error is repeatable from one motion to the next. If that were not true, a feedback technique would be necessary and that has limitations, including the fact that a correction term can be effectuated only after the error has occurred. The motion input electrical signal is expressed in digital form, as binary bytes driving a digital-to-analog converter or a pulse train drive to the microstepper motor. Finally, with this system, the motion error is detectable to the desired resolution of correction. The correction is stored in memory and recalled at a rate sufficient to provide for error correction of the mechanical motion.

Operation of the motor is controlled through microstepping driver circuitry. Pulses from a variable frequency clock are applied to the driver circuitry and motor speed is directly related to clock pulse rate. The clock pulse rate is controlled by the memory, the digital output of which is characterized for each specific motor. A reference position detector determines when the motor is close to the desired start or reference position, for example, within four poles of that position. The start position is accurately determined by energizing one of the poles of the reference four-pole group, thus creating an arbitrarily designated electrically determined reference position.

As stated previously, reasonably accurate microstepping motion is achievable by creating precise current ratio values in the motor phase windings, but velocity accuracy to the degree necessary for the applications to which this invention is directed is not achievable solely by ratio control. This invention does not change the sine/cosine current relationships in the motor windings. By way of distinction, the rate of change of the sine/cosine motor current is varied to achieve desired velocity control, in some cases constant velocity at the final motion location from the beginning to the end of the repetitive motion. Terms representing these rate changes are stored in preprogrammed memory and are read out to control motor velocity.

BRIEF DESCRIPTION OF THE DRAWING

The objects, advantages and features of this invention will be more readily appreciated from the following detailed description, when read in conjunction with the accompanying drawing, in which.

DESCRIPTION OF THE PREFERRED EMBODIMENTS

A stepper motor has inherent and characteristic errors in its motion from pole to pole. This is true also of a stepper motor operating in the microstepper mode. Even though the rotational increments are a fraction of those of the stepper motor, which are typically 1.8° per step, errors exist compared with the perfect position and velocity expected in response to an excitation pulse or series of pulses. Motors of the same model will have similar errors, but they are not exactly the same. Fortunately, these errors are repeatable, that is, between any two rotational positions between zero and 360°, the errors recur essentially the same each time the motor rotates between those positions and those errors are not cumulative. This set of factors is a key to the present invention and includes the assumption that motor load inertia does not change during rotation.

Information display systems provide examples of motion control systems having a requirement for very precise control of the velocity of the object being moved. In this example, the object may be a mirror, a prism, a polygon or a holographic disc, ultimately controlling a beam of light, such as a laser beam.

The human eye can distinguish extremely small pixel velocity errors, which reveal themselves as character movement or distortion. Most laser scanners use some form of mechanical movement to deflect the laser beam, examples of which were mentioned above. In addition to the mechanical rotational distortions, laser scan systems also contain optical distortions due to optically scanning a flat image plane. Some systems utilize complex lens techniques to reduce the scan nonuniformities. Laser paper printers are an example of that technique. The scan motion linearity problem is magnified in severity when the motion is start/stop, such as is true of the vertical frame scan of a microfilm image scanner. The vertical scanner must start an inertial mass in motion, bring it to a constant velocity for the duration of the scan, stop the mass and reset to the starting scan position.

Extreme positional and velocity accuracy can be achieved by this invention where the excitation pulse frequency to the microstepping motor is controlled through a memory which contains the unique data for each individual motor to account for these rotational errors. Once the characterizing process is accomplished for a motor for repeated rotation through a predetermined arc, other factors being equal, the motor will perform in exactly the same extremely accurate manner when its rotation is controlled by that memory output.

This process can be employed for control of a microstepping motor in any application where constant or precisely controlled velocity is desired. However, it will be beneficial to describe it in conjunction with a particular application so that its purposes and functions will be readily apparent. It will then be understood how the characterized motor can be used in other applications. A laser scanning system used for information display has been previously alluded to. This is the context within which this invention is described. It should be noted that describing the invention within a specific context does not so limit it. This velocity control system applies wherever such accuracy can be beneficial. Further, the invention is not limited to variable reluctance, permanent magnet or hybrid motors, but can be useful with any stepper motor based motion system, including linear as well as rotating, having the characteristics of repeatability, a digital electrical input signal and motor motion errors detectable to the desired resolution of correction, digital representations of those errors being capable of being stored in and recalled from memory so as to provide for the desired error correction.

This invention utilizes commercially available stepper motors which are capable of operating in the microstepper mode by employing conventional techniques. A standard ±3% accuracy in stepper positioning is acceptable, because all such errors are corrected by this invention. It is important to note that a stepper motor of greater or less accuracy could be utilized and its motion corrected by this invention, as long as the motion of the motor is repeatable.

Figure 1:
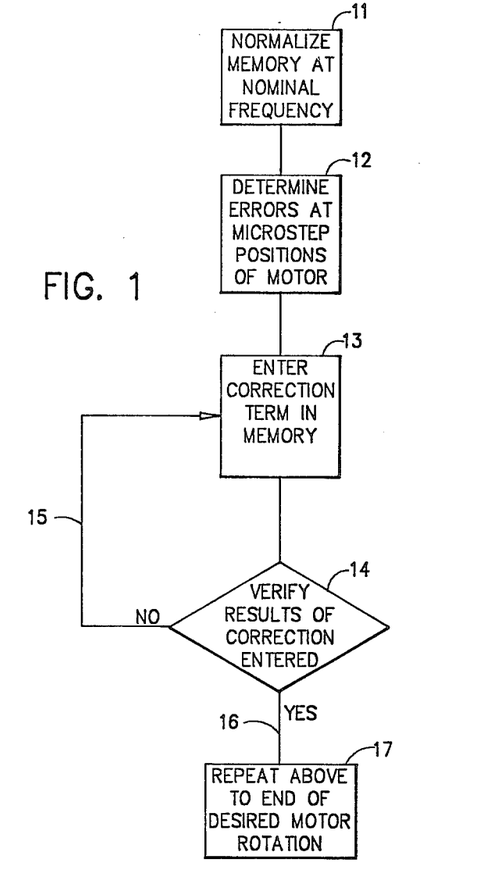
FIG. 1 is a flow chart of the motor characterizing process of the invention.
Figure 8:
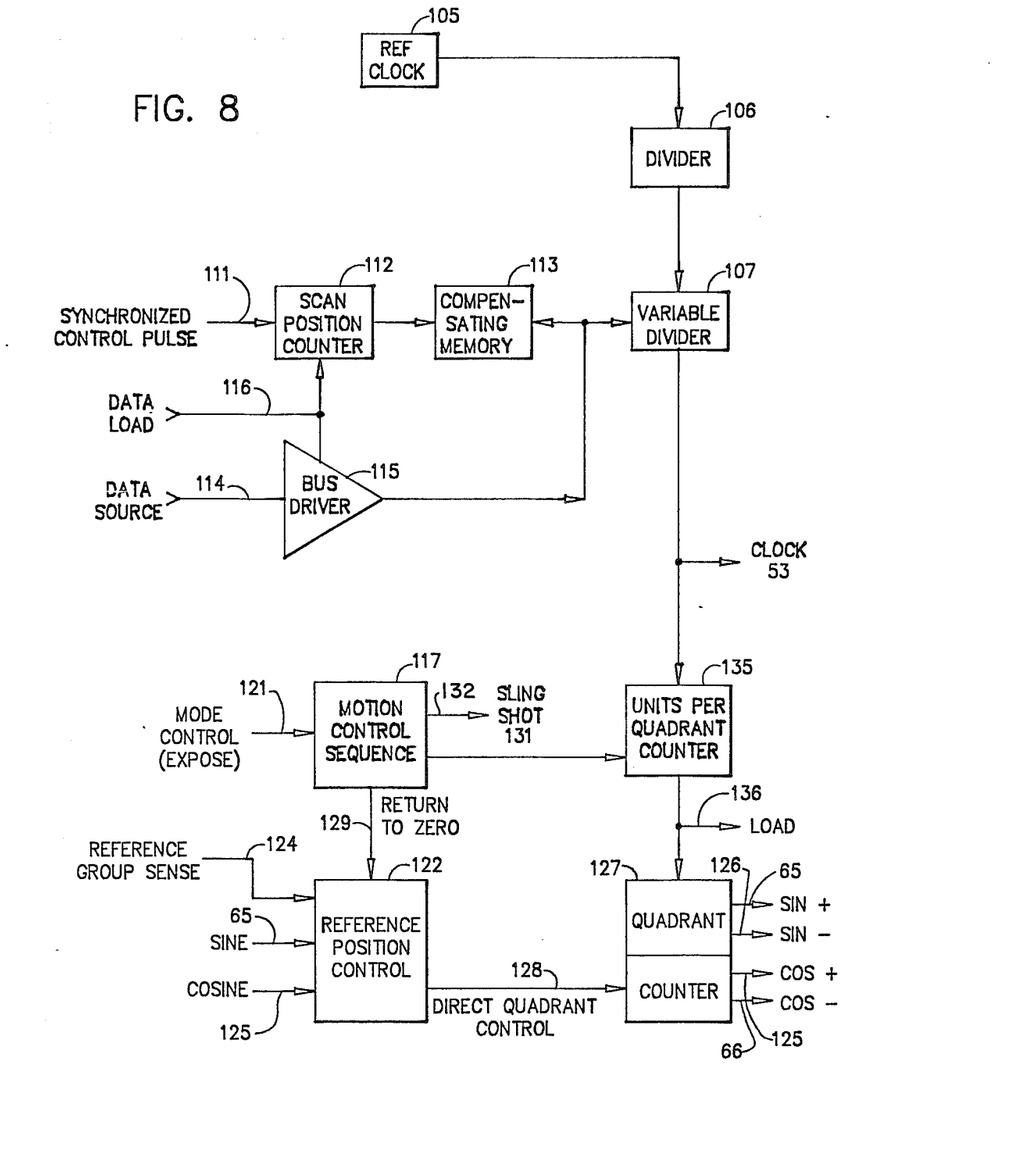
FIG. 8 is a block diagram of the image generator portion of the system.

With reference now to FIG. 1, the general steps of the characterization process will be described, assuming the basic conditions set forth above to be present. FIG. 1 represents a flow chart of the steps involved. A memory which controls the motion of the microstepper motor is shown in FIG. 8, represented by reference numeral 113. The first step, as shown in block 11 in the flow chart, is to normalize the memory at nominal frequency. In this expository example, 24 KHz will be taken as the nominal frequency. It is precisely 23.8 KHz but the rounded figure will be used herein for discussion except where precision is required. The motor is energized to move repetitively through a predetermined range of motion under control of the normalized memory. All the built-in motion and optical distortion errors will be present.

The output motion is measured to the desired resolution at predetermined points in the motion to determine the velocity error at each point (block 12). Since velocity is the differential of position with respect to time, velocity can be determined by known the instantaneous position at each instant of time of the motor motion.

Correction terms which will modify the motion input signal are created and stored in memory (block 13). These terms are those that will result in an output motion that is free of error to the required resolution. The motion generating system input signal is corrected so that the modified input signal contains the original error producing input term, plus the correction term recalled from memory for each digital increment of motion. Thus, in block 14 the modified input signal is tested to see if the resulting velocity is correct by running the motor with the memory containing the correction terms. If unacceptable errors persist, the correction term step is repeated, represented by NO line 15.

When the error is corrected, YES line 16 leads to block 17 indicating that the process is repeated until the entire repetitive motion is corrected to produce the precise velocity desired. Position error measurements may be made at any convenient point of motor motion, but normally corrections made about every ten microsteps will achieve the desired velocity accuracy in the laser optical scanning system used as the example herein.

Since the motion errors are repeatable, the same correction terms can be used for each sequential motion. This is especially true for constant velocity motion where, according to Newton's first law of motion, a body in motion continues to move at a constant speed along a straight line unless it is acted upon by an unbalanced force. The characterization process removes the unbalanced forces so that the resulting motion is constant. By using digital techniques to determine the motion error terms, the correction terms can be stored in memory and recalled at the particular instant required to correct the motion. Thus, once the motion is characterized, it need not be done again because of the repeatability factor.

Figure 2:
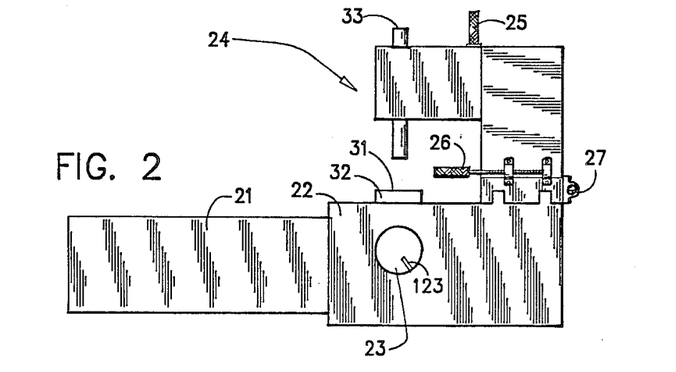
FIG. 2 is a schematic representation of the apparatus employed to detect and measure velocity errors in the motor motion.

The apparatus used to determine positional (and thereby velocity) errors, is shown in FIG. 2. Laser 21 generates the desired laser beam which is directed through image plane 31 by means of optics 22. As explained before, the horizontal sweeps of a laser scanning system may be generated by a rotating holographic disc as is known in the art. That disc would be positioned within, or be a part of, optics 22. Stepper motor 23 then may be used to generate the vertical scan by driving a mirror or other light directing element through repetitive motion over a predetermined rotational arc. Again, the invention is not limited to a laser scanner for information writing or display systems, but that is a convenient context within which to frame the description. An example of a laser optical scanner employing a holographic disc for horizontal scanning and an oscillating mirror controlled by a galvanometer for the vertical scan is shown in U.S. Pat. No. 4,337,994.

Traveling microscope 24 is formed with cross hairs and is secured to the laser test apparatus. It has three-way adjustment knobs 25, 26, 27. Image plane 31, where the laser beam sweeps under horizontal and vertical motion control, is at the top surface of frame mount 32 and microscope 33 is focused at the image plane. Micrometer adjustment 26 is calibrated at 50 microinch increments so that very fine adjustments can be made and the amount of the adjustment observed and measured.

The horizontal sweep lines can be selectively energized so that a few or several appear at the image plane. The micrometer adjusts the vertical position of the cross hairs as necessary to measure the distance between a given member of horizontal sweep lines, such as 10. In this way the vertical sweep velocity can be measured so that correction terms can be derived and entered in the memory.

As this apparatus is set up, ten vertical microstep pulses, at the nominal 24 KHz step rate, occur in the course of each horizontal sweep. Initially relatively coarse adjustments may be made, for example, by observing the sweep position at the beginning of every fifth horizontal sweep, or every 50 vertical microsteps. The traveling microscope is employed to detect each positional error and measure its magnitude at the selected positions. For each error detected and measured, a correction term is entered into memory to speed up or slow down the microstep pulse rate at that point. Actually, the correction term must be entered about four or five sweeps (40 or 50 microsteps) ahead of the pulse resulting in the observed error in order to allow the correction to take effect at the desired time. This delay is caused by the rotational inertia involved in changing, in the period of a few milliseconds, the rotational speed of the stepper motor and its load.

With appropriate entry means such as a computer, the memory, nominally producing a signal controlling a clock to produce a 24 KHz signal, is adjusted to produce clock pulse signals at a rate faster or slower than 24 KHz. If the position of the laser beam, under stepper motor control, is lagging behind its predetermined location, the signal rate is speeded up, to effectively shorten the sine wave to the motor windings and cause the motor to speed up and the laser beam position to lengthen slightly and return it to the desired position at the proper time. The opposite is true if the detected position is ahead of that desired.

Once the coarse correction are made, the motor is run with control signals from the corrected memory and further measurements are made. It is possible to check microstepper position at any, or even every, microstep position. It could be checked every ten microsteps, at the beginning of each horizontal sweep, or at any location or locations therebetween.

The correction terms programmed into memory enable it to control the clock to produce signals at some multiple of nominal clock period. If it is to function at 100%, that would mean exactly $4.2 \times 10^{-5}$ seconds (23.8 KHz). It may vary as little as 1% of the nominal period or $4.2 \times 10^{-7}$ seconds (238 Hz), or as much as 2.56 times the nominal period or $1.1 \times 10^{-2}$ seconds (60.9 KHz), in a practical apparatus. For purposes of the laser scanner of this example, the controlled clock rate typically ranges from 12 KHz to 80 KHz. Normal mid-motion adjustments are 5 KHz or less. These numbers are given by way of example only and are not meant to establish limits on the versatility of the invention. The range may be larger and adjustments could be quite different from 5 KHz.

Because motion errors are repeatable in the stepper motors contemplated to be employed with this invention, the same correction terms can be used for each sequential motion. Once the motor is characterized, that is, when the memory is fully modified for that motor, it can be used to run that motor repeatedly through the characterized range of motion without further adjustments.

In systems such as scanners utilizing final image optical elements, the image will, in general, contain a certain amount of distortion, even if the horizontal and vertical scanning systems move perfectly linearly, that is, the actual rotational velocity of the stepper motor is constant throughout the desired range of motion. This distortion is fixed once the system is set up since it is dependent on the lens grinding tolerances, the lens design and possibly other optical distortions. By measuring the final image plane distortion and putting the error correction terms in memory, the horizontal and vertical scanners are modified electrically to correct for the total image plane error to achieve constant motion of the beam at the image plane. The procedures for doing so are described above.

Thus it is important to realize that the principles of this invention are used, not to obtain precisely constant velocity of rotation of the motor rotor, but to obtain constant velocity of the scan beam at the image plane.

It is necessary that the motion output position errors be accurately determined and expressed as a number which can have its counterpart correction term stored in a digital electronic memory. The resolution of error determination (and the resultant correction terms) must be sufficiently greater than the resolution of the nominal increment of motion at the digital input of the motion control system. The rate at which the error correction terms can be read out of memory and utilized to correct the motion input signal determines the upper frequency limit.

At this point it will be useful to discuss some of the rates, frequencies and other parameters involved in the microstepper motor of this invention. The motor itself is a standard 200-step stepper motor, with a $\pm 3\%$ accuracy. Each step is 1.8 mechanical degrees and 90 electrical degrees. Thus for 360 mechanical degrees there are 18,000 electrical degrees per revolution. With known circuitry, a stepper motor can be converted to and operate as a microstepper where the sine and cosine waves are comprised of a multiplicity of pulses. The speed of the motor depends on the frequency of those pulses. The example here is a pulse frequency of 24 KHz, which will result in a predetermined motor speed. A higher pulse rate causes the motor to run faster and a lower pulse rate slows the rotational speed.

As stated previously, there are inherent inaccuracies in the motion of a microstepper motor. Theoretically, a constant input frequency should result in a constant rotational velocity, but that does not happen in practice. Even if it did, the previously referred to optical distortions would result in a beam sweep velocity which is other than constant at the image plane. Important aspects of this invention are to detect and measure the velocity variations from nominal and then use those measurements to control the operation of the motor. Where motor speed is too high, the input pulse frequency is reduced. Where motor speed is lagging, input frequency is increased. These frequency changes can be effected from a memory with the correction terms stored at appropriate locations therein. The required correction terms can be determined for any pulse location in the desired range of motion of the motor.

Figure 5A:
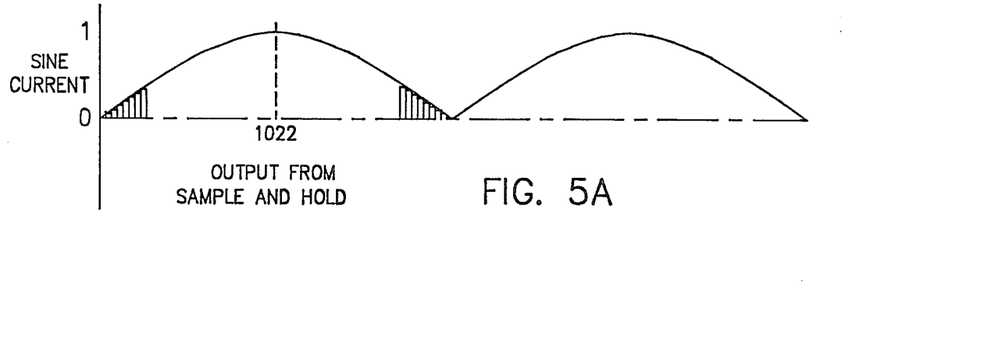
FIGS. 5A and 5B depict the pulses applied to the motor quadrature windings from the sample and hold circuits.
Figure 5B:
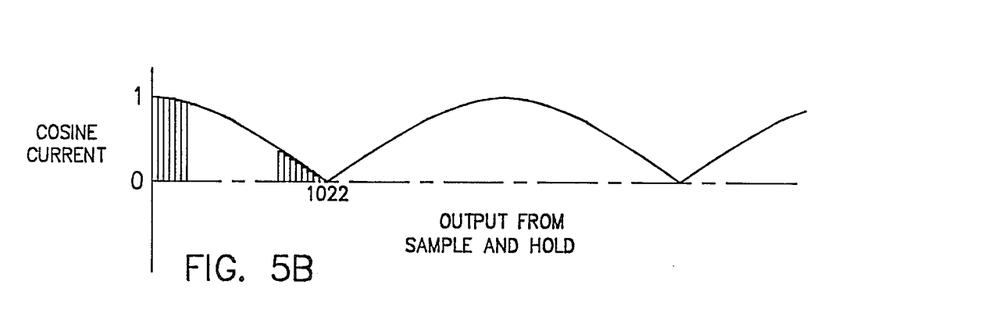

In this example, there is a binary address of 0 through 1022 for 90 electrical degrees. That means that this microstepper has 204,600 steps or mechanical increments per 360° of revolution. With reference to FIG. 5, it can be seen that the sine and cosine waves applied to the motor winding input circuits are comprised of a multiplicity of pulses. Specifically, there are 1023 pulses for each 90 electrical degrees and the pulses occur at the rate of 23.8 KHz.

Figure 3:
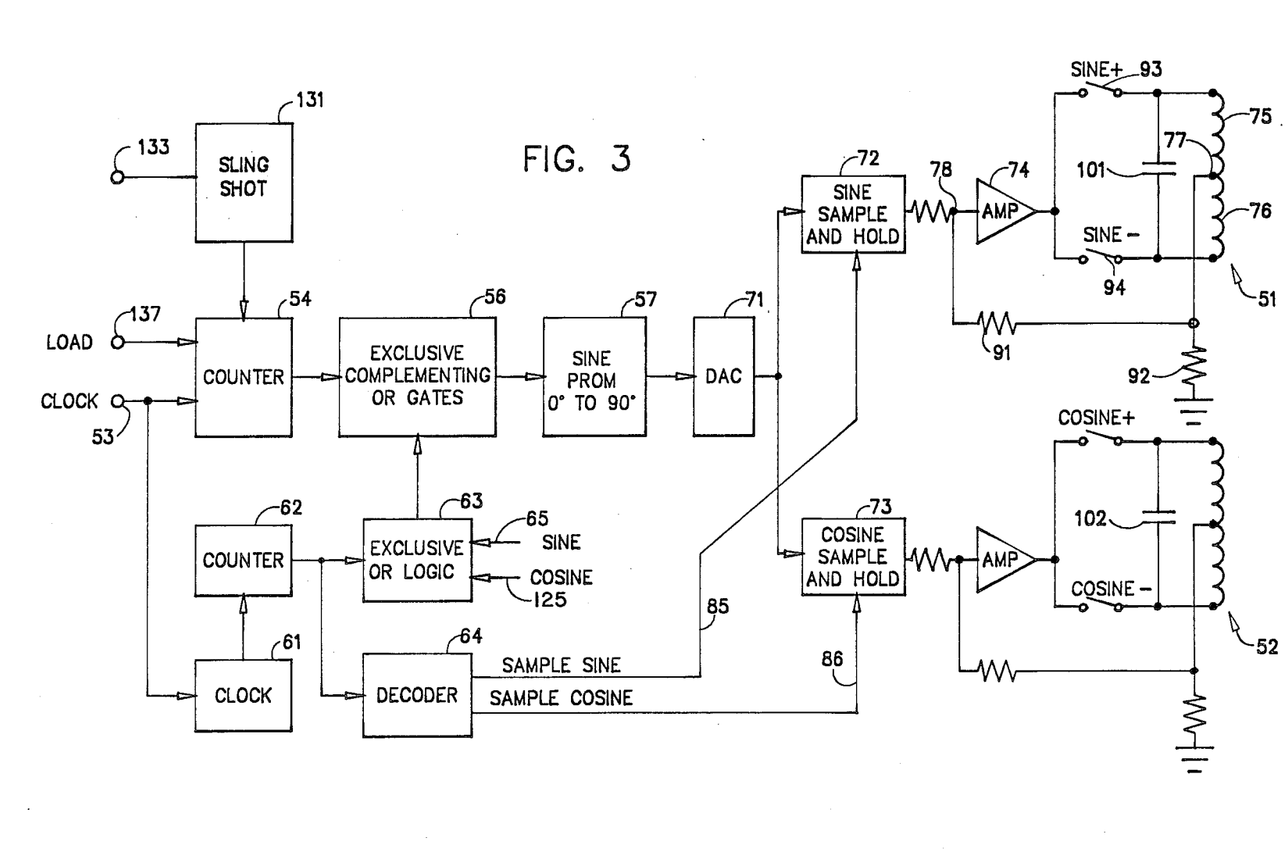
FIG. 3 is a block diagram of the driver control portion of the motor operating system.

After the memory has been modified as a result of the characterization process for a particular motor, it is then used as an integral part of the motor control system. A system for controlling a thus characterized motor is shown in FIG. 3, which is the driver control portion of a laser scanner system in schematic form. The signals to the driver control come from the image generator of FIG. 8.

Stepper motor phase A winding 51 and phase B winding 52 are shown on the right side of FIG. 3. The signals from memory, that is, the 24 KHz clock signals, modified in frequency as a result of the characterization process, are applied at terminal 53 on the left side of the diagram. These signals enter step counter 54 which counts to a predetermined number, for example 0–1022, and returns to zero for each 90 electrical degrees and 1.8 mechanical degrees. This counting continues as long as there is an input pulse stream from the image generator of FIG. 8. The counts or addresses enter complementary exclusive OR gates 56, the signals from which are applied to sine PROM 57. The sine PROM has stored in it in digital form the trigometric functions of a sine wave from 0–90° at addresses 0 through 1022 in equal angular increments.

Reference will be made to the wave forms of FIGS. 4–7 to facilitate understanding of the signals operative in FIGS. 3 and 8.

Figure 4:
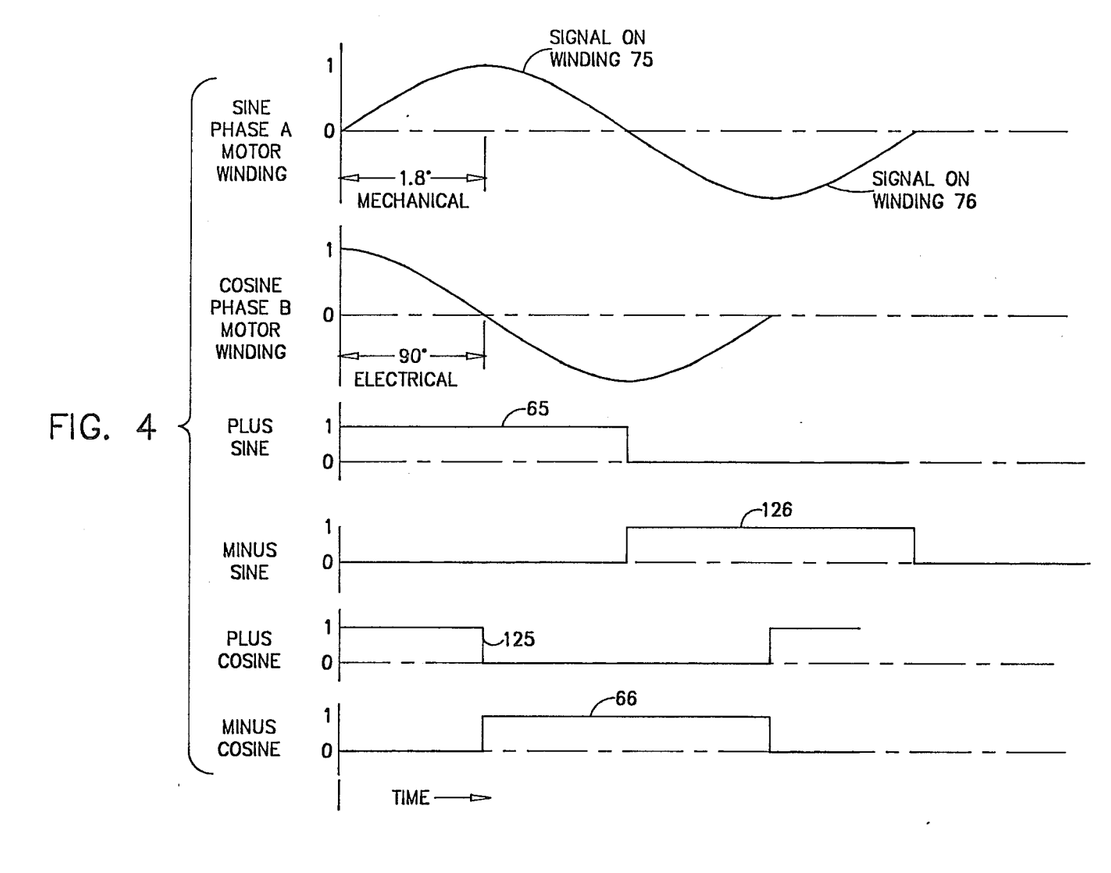
FIG. 4 shows the relationships of various operating aspects and signals of the system.
Figure 6:
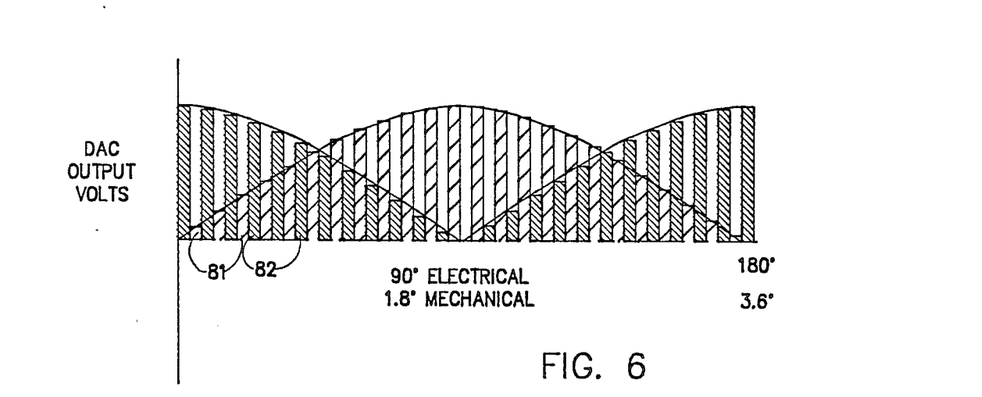
FIG. 6 shows the simultaneous sine and cosine waveforms from the digital to analog converter.

The input modified 24 KHz signal is also applied to clock 61 which starts counter 62. Counter 62 runs at a frequency substantially higher than nominal frequency, but in groups of six pulses. That is, counter 62 counts from 0 to 5 and recycles. Binary data from this counter are applied to exclusive OR logic 63 and to decoder 64. At the beginning of a cycle there are plus sine and plus cosine inputs 65 and 125 to logic 63, thereby defining the first quadrant or 0° to 90° (FIGS. 4–6). The signals from logic 63 and from decoder 64 essentially control the functioning of the rest of the circuit of FIG. 3, and will be detailed below.

Figure 7A:
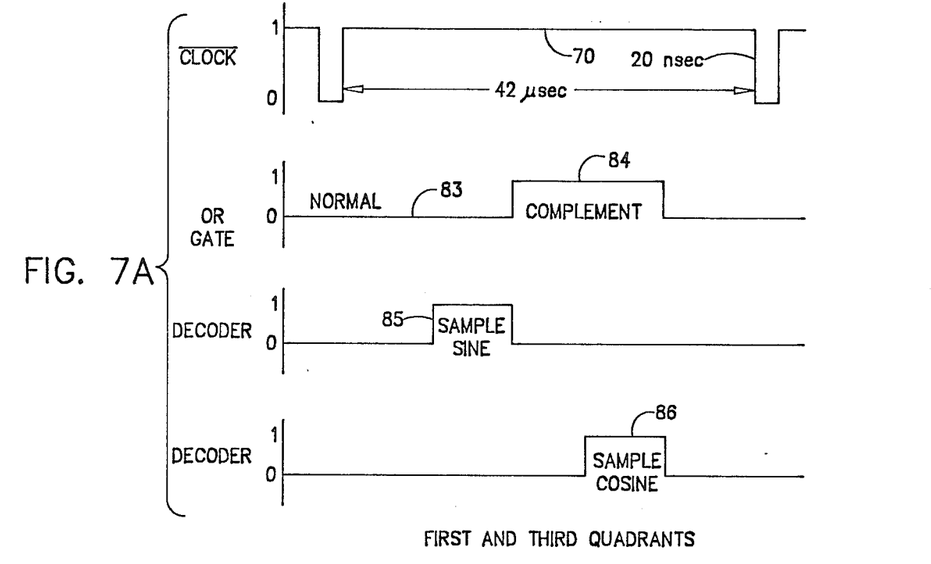
FIG. 7A shows the relationships of several of the control signals functioning in FIG. 3 in the first and third quadrants.
Figure 7B:
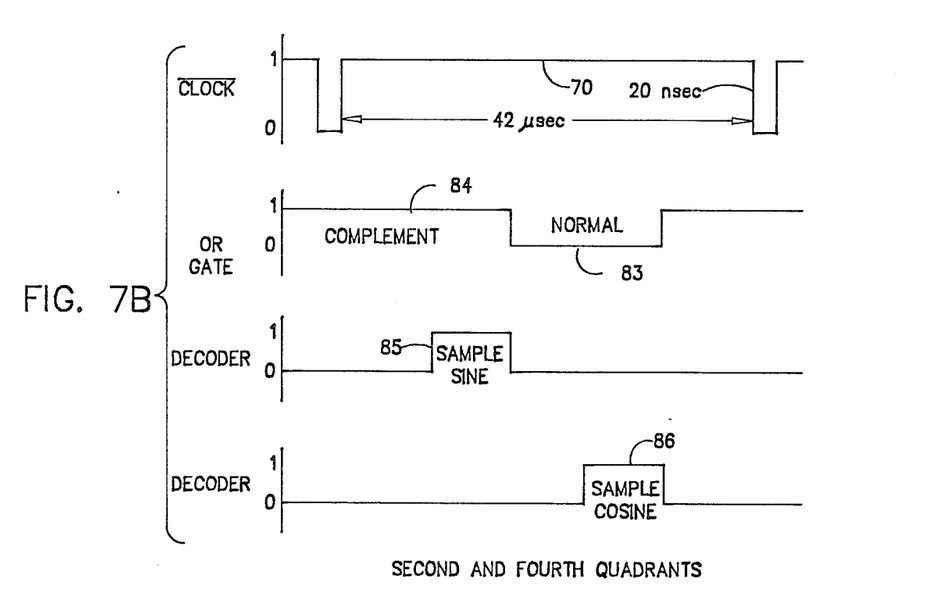
FIG. 7B is similar to FIG. 7A, showing the control signal relationships in the second and fourth quadrants.

Digital to analog converter (DAC) 71 has a very important function in this system. The DAC receives alternating angle and complement angle address digitial signal values at the modified nominal frequency. The output analog signal comprises pulses which alternate between the sine of the angle addressed and the sine of the complement angle addressed (which is equal to the cosine of the angle addressed), to alternately generate sine and cosine wave increments (see FIG. 6). There is one sine pulse 81 and one cosine pulse 82 for each 24 KHz pulse. Sine sample and hold circuit 72 and cosine sample and hold circuit 73 are functionally controlled by signals from decoder 64. From address inputs from counter 62, the decoder puts out alternating "sample sine" and "sample cosine" signals in synchronism with the respective sine and cosine pulses from DAC 71 (FIGS. 7A and 7B). The signal 70 from 24 KHz clock has a pulse width of 20 nsec with an off time of 42 μsec. In the time between each clock pulse, complementing OR gates 56 have a NORMAL condition 83 and a complement condition 84. Thus the sine PROM is triggered to alternately put out a sine value and the complement thereto, or cosine value, for each clock pulse. Table 1 depicts the functioning of sine PROM 57 when triggered by the complementing pulses shown in FIG. 6. In this Table, I=(90°/1023).

TABLE I

| COUNTER ADDRESS | ANGLE | SINE | COMP ADDRESS | COMPLEMENT ANGLE | SINE |
|---|---|---|---|---|---|
| 0 | 0° | 0.0 | 1023 | 90° | 1.00000 |
| 1 | $1 \times \left(\frac{90°}{1023}\right)$ | .001535 | 1022 | 1022 × I | .999998 |
| 2 | 2 × I | .003070 | 1021 | 1021 × I | .999995 |
| 3 | 3 × I | .004060 | 1020 | 1020 × I | .999989 |
| 4 | 4 × I | .006142 | 1019 | 1019 × I | .999981 |
| 5 | 5 × I | .007677 | 1018 | 1018 × I | .999970 |
| 1018 | 1018 × I | .999970 | 5 | 5 × I | .007677 |
| 1019 | 1019 × I | .999981 | 4 | 4 × I | .006142 |
| 1020 | 1020 × I | .999989 | 3 | 3 × I | .004060 |
| 1021 | 1021 × I | .999995 | 2 | 2 × I | .003070 |
| 1022 | 1022 × I | .999998 | 1 | 1 × I | .001535 |
| 1023 | 1023 × I (=90°) | 1.000000 | 0 | 0 | 0.0 |

To further explain Table 1, certain mathematical relationships and identities will be helpful. The sine of an angle is equal to the cosine of the complement of the angle ($\sin \angle = \cos \angle c$). The complement of an angle is 90° minus the angle ($\angle = 90° - \angle$). That is:

Sin 0° = 0.0

Cos 0° = sin (90° − 0°) = 1.000     (Eq. 1)

Sin 1° = 0.01745

Cos 1° = Sin (90° − 1°) = 89° = 0.99984     (Eq. 2)

Sin 89° = 0.99984

$$\text{Cos } 89° = \text{Sin } (90° - 89°) = \sin 1° = 0.01745 \quad \text{(Eq. 3)}$$

Within each pulse period "sample sine" signal 85 from decoder 64 triggers sine sample and hold circuit 72 to apply the sine signal from DAC 71 to motor winding 51. Also during each pulse "sample cosine" signal 86 from decoder 64 triggers cosine sample and hold circuit 73 to apply the cosine signal from DAC 71 to motor winding 52. The outputs from these sample and hold circuits are shown in FIGS. 5A and 5B and are changed for each 24 KHz clock pulse. Every 90 electrical degrees, normal 83 and complement 84 signals are reversed on command of exclusive OR logic 63. Note from FIG. 6 and Table 1 that the values of the sine wave from 90° to 180° are the same as the cosine wave values from 0° to 90°.

When the motor has microstepped 1023 times through 90 electrical degrees of rotation, the signals from sine PROM 57, that reflected increasing sine values, are then changed to cosine values from 0° to 90° to provide decreasing sine values, all the while providing the alternating sine and complement, or cosine, values to DAC 71. In this way the other half, 90° to 180°, of FIG. 6 is generated to provide the sine and cosine signals to the motor windings. Note that the outputs from the sample and hold circuits are always plus. Polarity changes to the motor windings are accomplished by switches 93 and 94, together with center tap 77 for phase A winding 51.

The complementing and quadrant change technique which permits simultaneous generation of full sine and cosine waves from recorded incremental sine values only from 0° to 90° will now be explained in more detail. Addresses from gates 56 increment sine PROM 57 at the modified 24 KHz rate. Counter 62 operates at a much faster rate, approximately 220 KHz in our example, in groups of six pulses each. The first two pulses represent the NORMAL state (FIG. 7A). On the third pulse decoder 64 emits sample sine signal 85, enabling the sine signal on sample and hold circuit 72 to be applied through the power amplifier to motor winding 51. When exclusive OR logic 63 receives the fourth pulse, it orders gates 56 to complement so that the cosine value from PROM 57 is applied to the DAC. During the fifth pulse, the DAC has time to settle. Decoder 64 detects the sixth pulse and emits sample cosine signal 86, enabling the cosine signal on sample and hold circuit 73 to be applied to winding 52 through the power amplifier circuitry.

The quadrant in which the circuit is operating is controlled by signals from quadrant counter 127 of FIG. 8. In the first quadrant, both plus sine and plus cosine are applied to logic 63 (FIGS. 3, 4 and 8). The signals to logic 63 producing the second quadrant of operation are plus sine and minus cosine. These quadrant signals are also applied to the switches (93, 94) at the motor windings to, in conjunction with the center tap, control polarity.

This process continues, with the counters recycling as needed until the motor rotor reaches the end of its desired travel, whereupon it goes into the return-to-zero mode, which will be explained in the discussion of FIG. 8.

The complementing technique described above is presently a preferred embodiment of the invention. It should be noted that it is not necessary to use this technique in the stepper motor control system. The driver control circuitry of FIG. 3 could employ separate, synchronized, sine and cosine PROM's and there would then be no need for the sample and hold circuits since the sine and cosine analog signals would be generated simultaneously. However, that would require the use of two DAC's, with consequent additional problems. A DAC has its own error factor so if two were used, they would have to be balanced, matched in tolerance, or otherwise paired so that their own errors are corrected for.

Connected to windings 51 and 52 themselves are the power amplifier and related circuitry shown at the right side of FIG. 3. Voltage-to-current amplifier 74 feeds the sine signal from sample and hold circuit 72 selectively to top half 75 and to bottom half 76 of winding 51. The switch between windings changes every 90° electrical, so FIG. 7A shows the signals when top half winding 75 is energized in the first and third quadrants and FIG. 7B shows the differences for second and fourth quadrants. A closed loop feedback circuit connects winding center tap 77 to input 78 of amplifier 74 through resistor 91, the feedback signal level being generated across resistor 92, which is a very small value, preferably about one ohm. Switches 93 and 94 are normally open and are preferably solid state devices. Switch 93 is closed when plus sine signal 65 (FIG. 4) is present and switch 94 is closed when minus sine signal 126 is present. These switches are not both closed at the same time. Phase B motor winding 52 has identical power amplifier circuitry and operates in the same way under control of plus cosine signal 125 and minus cosine signal 66.

Current is made to be an accurate representation of input voltage by the use of the above feedback circuit in series with the winding, coupled with current sensing resistor 92. This places the motor winding within the feedback loop and eliminates one source of microstepper inaccuracy, which is the fixed manufacturing tolerance variations in resistance between windings on either side of the center tap, and the dynamic effect of temperature changes on the windings.

Another aspect of the invention that helps make a stepper motor operating in the microstepper mode easier to characterize is the use of tuning capacitors 101 and 102 across windings 51 and 52 respectively. Damping capacitors have previously been connected across the windings to be employed for their normal purpose in stepper motor operation. When operating in the full step mode, such a motor definitely starts and stops. Since there is a certain amount of mass involved, there is typically an oscillation or ringing that occurs at the end of each step. Thus the need for a damping device of some type. Because a microstepper runs relatively slowly and in extremely small increments per step, essentially smoothly running through its intended rotational motion, damping means have not been necessary, except possibly at the end of the intended rotational motion. It has been found that by connecting tuning capacitors 101 and 102 across the respective windings, linearity of motor velocity is improved. The value of each capacitor is chosen so that it creates a tuned circuit with its associated motor winding. To create the resonant circuit with improved motion linearity described above, a capacitance of about 100 μf is employed across each full phase winding (51, 52), having an inductance of 18 mh. By so structuring the capacitor and winding, it reduces mechanical resonance. By way of contrast, for damping a full step motor, a capacitor of 3–14 μf would typically be used. That damping means would not affect linearity of motion and would have no beneficial purpose with the present microstepper motor operation.

By way of further explanation of the function of the tuning capacitors, even though the microstepper operates continuously in very small steps rather than in discrete, coarse steps, there is a mechanical resonance present because of the rise and fall of rotor speed as a pole or tooth alignment is approached and passed. Since there is very little load contemplated in the apparatus with which the motor is intended to be used, those minute mechanical resonance forces affect velocity linearity. By reducing the effects of mechanical resonance by means of the tuning capacitors described, the desired result is achieved.

The signals that control the operation of the driver control circuitry of FIG. 3 come from the image generator shown in FIG. 8. Reference clock 105 produces a controlled frequency output signal, 50 MHz in this example. Divider 106 divides the clock output frequency by an appropriate number, such as 21, to obtain a 2.38 MHz output. This frequency is further divided by variable, controlled divisors, the values of which are determined by the characterization process. These divisors are applied by variable divider 107, as controlled by the output terms from memory 113, to produce the modified 23.8 KHz clock pulses applied to terminal 53 of FIG. 3.

External signals applied to the FIG. 8 image generator come from other aspects of the system which are not part of this invention. As stated previously, the example being used for discussion purposes is a laser optical system used for printing microfiche frames with information. As such, it has horizontal sweep circuitry and other elements external to the invention, which supply most of the signal inputs on the left side of FIG. 8.

Synchronized control pulse 111 is applied to counter 112 which addresses compensating memory 113. Because a microfiche scanner system has been used as an example, this description will continue in that manner. Thus pulses 111 are scan pulses and counter 112 is a scan position counter. This enables the vertical scan to be synchronized with the horizontal scan.

The correction terms determined from the apparatus of FIG. 2 are entered into compensating memory 113 through data source signals 114 and bus driver 115. The raw data from the FIG. 2 apparatus measurements are entered in an appropriately programmed computer and converted to the proper signal form for entry into memory 113. Data load signals 116 are applied to counter 112 and bus driver 115 to coordinate entry of the data into the memory.

Motion control sequence 117 is controlled by mode control signals 121. In a laser scanner writing system, these may be termed "expose" signals. One output from sequencer 117 is to reference position control 122. A slit 123 (FIG. 2) in a disc attached to the rotor of motor 23 is sensed in conventional manner to determine reference position. In a stepper motor this need not be an extremely accurate sensing device because the motor will accurately, electrically return to its reference position when it receives a signal to stop at that position. That is reference group sense signal 124 applied to control 122. Sine and cosine signals are also applied to control 122 to enable quadrant counter 127 to provide the outputs shown.

When the expose signal becomes true or active, the applicable counters, such as counter 54 in FIG. 3, are counting upward at their microstep rate, units per quadrant counter 135 is activated and the sling shot operation is sequenced (if that option is used) to start the microstepper motor rotation. This option will be discussed in greater detail below. At the same time load signal 136 is applied from counter 135 to terminal 137 in FIG. 3 to reset counter 54. Every 90 electrical degrees, or full sequence of counter 54, quadrant counter 127 is incremented to the next quadrant, which generates the appropriate polarity sine and cosine signals for that quadrant.

At the end of the print cycle, normally at the bottom of a page or microfiche frame, the expose signal turns off or becomes false. Motion control sequence steps forward, sending a return to zero signal on line 129 to reference position control 122. The motor thereupon steps back to its reference position by full step or half step, depending on the count and quadrant selection defined by reference position control 122. It is also possible to return by microstepping at any desired frequency (speed) with appropriate changes in the circuitry shown.

From control 122 comes direct quadrant control signal 128 applied to quadrant counter 127 which supplies sine plus, sine minus, cosine plus and cosine minus signals 65, 126, 125 and 66 respectively. For synchronizing purposes, the modified frequency pulses from divider 107 are applied to units per quadrant counter 135, as are signals from sequencer 117. The outputs from counter 127, shown graphically in FIG. 4, are applied to the FIG. 3 driver control apparatus at the locations shown to control exclusive OR logic 63 and the sine and cosine winding polarity switches.

In order to get the motor up to and stabilized at the desired speed by the time the horizontal scans are subject to an expose or write signal, two different approaches may be used. In a normal laser optical scanner, the horizontal sweeps are running continuously, even between each page or frame of a multiframe microfiche. Positioning determines when an expose or write signal is applied to energize the dots to sweep across the frame. One way to get the vertical scanner microstepper motor up to speed is to have the retrace movement go past the reference position and use a "sling shot" approach to get the motor to the desired speed. This is a procedure by which the motor starts at a position behind the reference position, is kicked forward to the reference position at the start commmand, and proceeds forward in microstep mode to the operating velocity. At the start command the motor quickly moves to the zero degree position on the first microstep, as controlled by sling shot block 131. A signal on line 132 from motion control sequence 117 in FIG. 8 is applied to terminal 133 in FIG. 3 to effect the desired starting motion. Then normal rotational inputs will have settled in and have the vertical scan motor at the desired velocity by the time exposure starts.

Alternatively, achieving the desired speed can be realized using the principles described herein for controlling motor velocity. At the reference location, the motor can be given a high speed kick, at a frequency greatly in excess of the nominal 24 KHz, possibly 80 KHz for the period of one horizontal sweep. Then to settle it in, the applied frequency may be substantially lower than nominal, in the range of 12 KHz for several horizontal sweeps. Then more fine adjustments are made by means of frequency control through memory 113 so that precise rotational velocity is achieved by the time, possibly after about sixteen horizontal sweeps, the expose signal is applied to start writing the microfiche frame. Again, the relationship to horizontal sweeps is for reference only and is not limiting. The memory based frequency speed control, for starting and running the motor, is applicable wherever such accuracy can be beneficial.

Although the above description of the invention has been in terms of controlling velocity of a rotating microstepper motor in a laser optical scanning system, the same principles apply wherever constant velocity is important and a repeatable position motor can be used. Additionally, and equally important, this invention can be employed to control the rotational velocity of stepper motors in any desired manner, not just to achieve constant velocity.

As noted previously in a laser optical scanner the important end result is constant scan speed at the image plane. It may be that the rotational velocity of the motor rotor is other than constant so long as the post optics motion of the light beam has a constant velocity. Of course, these facts lead to the conclusion that microstepper motor rotational velocity is precisely controllable by employing the principles of this invention.

All of the statements made with respect to a rotating microstepper motor can be equally applied to a linear microstepper motor. The system of this invention can control the motion of such a motor in the same way. Thus the term "distance" can be employed to generically refer to either a linear distance or angle of rotation.

It is useful to discuss the cost advantages of this extremely accurate velocity producing apparatus compared with a galvanometer controlled device for the same purpose. Since a galvanometer is very delicate and not thermally stable, additional corrective means are necessary, adding significant expense. The precision galvanometer itself is more costly than is a stepper motor. The drive circuitry is also of lower cost of the present microstepper operation. Overall, equivalent or greater accuracy can be achieved by the present invention at approximately one-fourth the cost for a galvanometer based system.

It is important to realize that motion correction attempts with respect to full step stepper motor operation has little or nothing to do with the considerations involved with a stepper motor operating in the microstepper mode. It is not just a difference in degree but a difference in kind. Adjusting speed, stopping and damping during rotational motion, when the motor operates with approximately 1000 times more steps per revolution, offers entirely different conditions and challenges.

In view of the above description, it is likely that modifications and improvements will occur to the person skilled in the art which are within the scope of the appended claims.

What is claimed is:

1. A method for characterizing the angular velocity of a stepper motor operating in microstepper mode with sine/cosine motor excitation currents, the motor being controlled in rotational speed by the frequency of the excitation pulses, said frequency being controlled by signals from a memory, the motion of the motor being repeatable with identical input excitation signals, said method comprising the steps of:
   generating an initial predetermined nominal frequency;
   energizing the motor at the nominal frequency;
   measuring time differences to reach predetermined desired positions of the motor;
   converting said time difference measurements into digital signals representing frequency correction terms in a form acceptable to the memory; and
   entering said frequency correction term in the memory for each time error detected.

2. The method recited in claim 1, and comprising the further steps of:
   reading out memory;
   energizing the motor with the nominal frequency as modulated by said frequency correction terms and then measuring any time differences to reach the predetermined desired dynamic positions of the motor to verify the results of the entered corrections on operation of the motor.

3. The method recited in claim 2, and comprising the further steps of:
   entering further correction terms in the memory when the verifying step reveals the existence of time errors; and then
   verifying the results of the entered further corrections on operation of the motor.

4. The method recited in claim 1, wherein the memory is a programmable memory.

5. The method recited in claim 1, wherein the correction terms are entered in memory at a predetermined number of pulse positions before the energizing pulse which corresponds to the detected position error location.

6. The method recited in claim 2, wherein the resulting angular velocity of the motor is constant.

7. Apparatus for producing repetitive motion at predetermined desired velocities, said apparatus comprising:
   a synchronous motor having quadrature windings;
   means for generating excitation pulses at variable frequencies within a predetermined range about a nominal frequency;
   driver circuitry means coupled to said motor windings for causing said motor to move in a microstep mode with the motor moving through a predetermined distance at a speed proportional to the frequency of the excitation pulses from said pulse generating means;
   memory means containing characterizing terms representative of the angular velocity characteristics of said motor for each microstep through said predetermined motion distance;
   means for applying said motor motion characterizing terms from said memory means to said pulse generating means to control the frequency of said pulses by said characterizing terms, thereby generating frequency characterized pulses; and
   means for applying said frequency characterized pulses to said driver circuitry means to thereby drive said motor through said predetermined distance at the velocities desired.

8. The apparatus recited in claim 7, wherein said driver circuitry means comprises power amplifier means for each phase winding of said motor.

9. The apparatus recited in claim 7, wherein said driver circuitry means comprises means for substantially simultaneously generating analog sine and cosine signals.

10. The apparatus recited in claim 9, wherein said sine and cosine signal generating means comprises:

a programmable read only memory means containing digital values representing the trignometric functions of a sine wave from 0° to 90°;

means for applying said frequency characterized pulses to said programmable read only memory; and means to generate a full sine and a full cosine wave from the values in said programmable read only memory.

11. The apparatus recited in claim 10, wherein said sine and cosine generating means further comprises means for converting the digital outputs from said programmable read only memory to analog sine and cosine signals.

12. The apparatus recited in claim 11, wherein said driver circuitry means comprises:

power amplifier means for each phase winding of said motor, the output of said converting means comprises alternating analog values of sine and cosine signals;

respective sine and cosine sample and hold circuits to apply the sine and cosine signals to said respective motor phase windings; and means for triggering said sample and hold circuits in synchronism with the respective signal values on the output of said converting means.

13. The apparatus recited in claim 7, wherein said pulse generating means comprises:

a source of clock pulses; and divider means for modifying the frequency of said clock pulses in accordance with the characterizing terms from said memory.

14. The apparatus recited in claim 7, wherein the predetermined desired velocities constitute a constant velocity.

15. The apparatus recited in claim 7, wherein said driver circuitry means comprises means for reversing the direction of rotation of said motor to return it to a reference position after it has moved through said predetermined distance.

16. The apparatus recited in claim 15, wherein said reversing means is adapted to return the motor to the reference position selectively by full steps, by half steps and by microsteps.

17. The apparatus recited in claim 15, and further comprising:

reference position detector means having a predetermined output when said motor has moved to a predetermined position, whereupon one of said motor windings is energized to lock the motor at the predetermined precise reference position; and means for coupling the output from said reference position detector means to said driver circuitry means.

18. Apparatus for simultaneously generating signals representing sine and cosine values in constant phase relationship, said apparatus comprising:

clock pulse generating means functioning at a predetermined frequency;

gating means coupled to said clock pulse generating means, said gating means having selectively actuated direct and complementing output conditions;

memory means programmed with digital representations of sine values from 0° to 90° in a predetermined number of increments, said memory means being triggered at said predetermined frequency by said clock pulses through said gating means;

logic means coupled between said clock pulse generating means and said gating means, said logic means triggering said gating means to alternate at said predetermined frequency between its direct and complementing output conditions, thereby causing the output of said memory means to alternate between sine value and cosine value, said logic means causing said gating means to reverse the output of said memory means after each segment of the predetermined number of increments to direct cosine values and alternating sine values.

19. The apparatus recited in claim 18, and further comprising means to convert the digital value from said memory means to analog values simultaneously comprising sine and cosine wave forms.

20. The apparatus of claim 18, and further comprising means to vary the frequency of said clock pulse generating means, resulting in constant phase relationship sine and cosine waveforms of varying frequency.

21. A method for controlling the angular velocity of a repeatable motion stepper motor having quadrature windings and operating in a microstepper mode with sine/cosine motor excitation currents at predetermined frequencies, the motor rotational speed being a function of the frequencies of the excitation signals applied to its quadrature windings, terms representing those frequencies being controlled by terms stored in memory means, said method comprising the steps of:

characterizing the motor by means of the following steps:

generating an initial predetermined nominal frequency;

energizing the motor at the nominal frequency;

measuring the time differences to reach predetermined desired positions of the motor;

converting said time difference measurements into digital signals representing frequency correction terms in a form acceptable to the memory; and entering said frequency correction term in the memory for each time error detected; reading out the memory;

generating simultaneous sine and cosine waveforms at frequencies determined by the frequencies of the memory with said frequency correction terms entered therein; and energizing the motor by applying the thus controlled frequency sine and cosine signals to the quadrature windings of the motor to obtain the desired speed of operation.

22. The method recited in claim 21 and comprising the further step of verifying the results of the entered corrections on operation of the motor.

23. The method recited in claim 21, wherein the correction terms are entered in the memory means at a predetermined member of pulse positions before the energizing pulse which resulted in the detected position error.

24. Apparatus for improving the linearity of the output motion of a stepper motor operating in microstepper mode with sine/cosine motor excitation currents, the motor having phase A and phase B quadrature windings, said apparatus comprising:

means for applying sine current signals to said phase A winding;

first capacitance means connected across said phase A winding, the value of said first capacitance means being such that, together with said phase A winding, a tuned circuit is created;

means for applying cosine current signals to said phase B winding; and second capacitance means connected across said phase B winding, the value of said second capacitance means being such that, together with said phase B winding, a tuned circuit is created;

whereby said tuned circuits comprised of said respective phase A and phase B windings result in reduced mechanical resonance of said microstepping motor when rotating.

25. Apparatus for correcting for inherent and temperature caused variations between winding resistances in a stepper motor operating in microstepper mode with sine/cosine motor currents, the motor having phase A and phase B windings, said apparatus comprising:

a source of sine current;

first amplifier means having an input coupled to said sine current source and an output selectively coupled to said phase A winding;

a first resistor coupled to said phase A winding, said first resistor sensing motor winding current;

a first feedback loop connected between said first resistor and said amplifier means input, said first resistor thereby placing said phase A winding in said first feedback loop and controlling the feedback signal level;

first switch means connected between said first amplifier means and said phase A winding to selectively alternate the connection of said first amplifier means to respective sides of said phase A winding;

a source of cosine current;

second amplifier means having an input coupled to said cosine current source and an output selectively coupled to said phase B winding:

a second resistor coupled to said phase B winding, said second resistor sensing motor winding current;

a second feedback loop connected between second resistor and said amplifier means input, said second resistor thereby placing said phase W winding in said second feedback loop and controlling the feedback signal level; and second switch means connected between said second amplifier means and said phase B winding to selectively alternate the connection of said second amplifier means to respective sides of said phase B winding.

26. Apparatus for producing repetitive motion at predetermined desired velocities, said apparatus comprising:

a stepper motor having windings;

means for generating excitation pulses at variable frequencies within a predetermined range about a nominal frequency;

driver circuitry means coupled to said motor windings for causing said motor to move in a microstepping mode with true trigonometric value sine/cosine motor currents, the motor moving through a predetermined distance at a speed proportional to the frequency of the excitation pulses from said pulse generating means;

memory means containing characterizing terms representative of the angular velocity characteristics of said motor at preselected microsteps through said predetermined motion distance;

means for applying said motor motion characterizing terms from said memory means to said pulse generating means to control the frequency of said pulses by said characterizing terms; and means for applying said frequency characterized pulses to said driver circuitry means to thereby drive said motor through said predetermined distance at the positions and velocities desired.

27. The method recited in claim 1, and comprising the further step of entering terms in the memory representing the initial predetermined nominal frequency to normalize the memory.

28. The apparatus recited in claim 7, wherein the excitation pulses are true trigonometric value sine/cosine motor currents.

* * * * *